United States Patent [19]
Glatzmaier

[11] Patent Number: 5,324,494
[45] Date of Patent: Jun. 28, 1994

[54] METHOD FOR SILICON CARBIDE PRODUCTION BY REACTING SILICA WITH HYDROCARBON GAS

[75] Inventor: Gregory C. Glatzmaier, Boulder, Colo.

[73] Assignee: Midwest Research Institute, Kansas City, Mo.

[21] Appl. No.: 7,268

[22] Filed: Jan. 21, 1993

[51] Int. Cl.$^5$ ............................................. C01B 31/36
[52] U.S. Cl. .................................... 423/345; 501/88
[58] Field of Search ................... 423/345, 346; 501/88, 501/90

[56] References Cited

U.S. PATENT DOCUMENTS

| | | |
|---|---|---|
| 4,162,167 | 7/1979 | Enomoto . |
| 4,327,066 | 4/1982 | Seimiya . |
| 4,419,336 | 12/1983 | Kuriakose . |
| 4,534,948 | 8/1985 | Baney . |
| 4,789,536 | 12/1988 | Schramm . |
| 4,869,886 | 9/1989 | Saiki . |
| 4,900,531 | 2/1990 | Levin . |
| 4,904,622 | 2/1990 | Dubots . |
| 5,021,230 | 6/1991 | Krstic . |
| 5,082,872 | 1/1992 | Burns . |
| 5,093,039 | 3/1992 | Kijima . |
| 5,128,115 | 7/1992 | Glatzmaier ........................ 423/345 |
| 5,165,916 | 11/1992 | Cheng et al. ...................... 423/346 |
| 5,190,737 | 3/1993 | Weimer et al. .................... 423/345 |

FOREIGN PATENT DOCUMENTS

| | | |
|---|---|---|
| 56-073615 | 6/1981 | Japan . |
| 61-6109 | 1/1986 | Japan . |
| 61-6113 | 1/1986 | Japan . |

Primary Examiner—Olik Chaudhuri
Assistant Examiner—Kenneth E. Horton
Attorney, Agent, or Firm—Ken Richardson; Edna M. O'Connor

[57] ABSTRACT

A method is described for producing silicon carbide particles using a silicon source material and a hydrocarbon. The method is efficient and is characterized by high yield. Finely divided silicon source material is contacted with hydrocarbon at a temperature of 400° C. to 1000° C. where the hydrocarbon pyrolyzes and coats the particles with carbon. The particles are then heated to 1100° C. to 1600° C. to cause a reaction between the ingredients to form silicon carbide of very small particle size. No grinding of silicon carbide is required to obtain small particles. The method may be carried out as a batch process or as a continuous process.

16 Claims, 2 Drawing Sheets

METHOD FOR SILICON CARBIDE PRODUCTION BY REACTING SILICA WITH HYDROCARBON GAS

The United States Government has rights in this invention under Contract No. DE-AC02-83CH10093 between the United States Department of Energy and the National Renewable Energy Laboratory, a division of the Midwest Research Institute.

BACKGROUND OF THE INVENTION

1. Field of the Invention

The present invention relates, generally, to methods for producing silicon carbide and, more particularly, to methods for producing silicon carbide having small particle size. Specifically, the present invention relates to improved methods which are more efficient than previously available for producing silicon carbide particles of very small diameter.

2. Description of the Prior Art

Silicon carbide is an abrasive material which is widely used in a variety of grinding and polishing applications. Its hardness is 9.5 on the Mohs scale and, therefore, is only slightly less than the hardness of diamond (which is 10 on the same scale).

Silicon carbide is conventionally made by reacting silica particles with carbon particles at 1800-2000° C. The chemical reaction for the process (known as the Acheson process ) is:

$$SiO_2 + 3C \rightarrow SiC + 2CO$$

Silicon carbide was first made by this reaction in 1891 in an electric arc furnace. High temperature is required for this reaction because the silica and carbon are contained in separate particles. At 1800° C., silica vaporizes, allowing the two reactants to come in contact.

Another known process involves the reaction of elemental silicon and carbon particles at 1100° C. to make silicon carbide, as follows:

$$Si + C \rightarrow SiC$$

Silicon carbide can also be produced with reactions between silanes and a hydrocarbon:

$$SiH_4 + CH_4 \rightarrow SiC + 4H_2$$

$$SiCl_4 + CH_4 \rightarrow SiC + 4HCl$$

Because the Acheson process requires high temperature and a long reaction time, particle growth during the reaction is significant and results in a relatively large particle size distribution (greater than 1 micron) that is not sinterable. These particles must be ground to a smaller size before they can be sintered.

The other two processes discussed above proceed at lower temperatures than the Acheson process, and the reaction times are shorter so that a small particle size distribution (less than 1 micron) results that can be sintered directly. The cost of the silicon sources (i.e., silicon and silane) for these two processes, however, are expensive as compared to the cost of silica, thereby resulting in an expensive silicon carbide product.

Today silicon carbide powders are produced in various grades. The differences between the high and low grades are purity and particle size. Low grade silicon carbide consists of relatively low purity (less than 98%) particles having a diameter of 0.1–10 millimeters. High grade silicon carbide consists of high purity particles (greater than 98%) having a diameter of 0.5 to 5 microns. Low grade silicon carbide is widely used as an abrasive in polishing and grinding wheels.

Because of its high melting point (2200° C.), silicon carbide is also used as refractory in high temperature furnaces. High grade silicon carbide is also sintered to make various types of components, such as fittings, feed throughs, etc. for high temperature applications.

Conventional manufacturing methods for producing silicon carbide utilize electric-resistance furnaces to provide the thermal energy which is necessary to produce the material. Such methods use a significant amount of energy. A solar energy furnace has also been used.

The costs associated with handling large quantities of electricity, and the costs associated with crushing the silicon carbide to smaller particles, account for the major costs in producing the material using conventional techniques.

U.S. Pat. No. 4,419,336 (Kuriakose) describes an improved electric resistance furnace for producing silicon carbide. U.S. Pat. No. 4,534,948 (Baney) describes a process for producing silicon carbide using specific polysilane polymers as starting materials. The polymer is heated to 1600° C. in an inert atmosphere to form silicon carbide. The main advantage of this approach is that the polymer can be pre-formed into fibers or other shapes which the silicon carbide assumes when it forms. These patents do not describe a process for forming silicon carbide of very small particle size.

U.S. Pat. Nos. 4,162,167; 4,789,536; 4,904,622; and 5,021,230 describe manufacture of silicon carbide particles using silica particles and carbon particles which are mixed and then heated to a very high temperature.

U.S. Pat. No. 4,327,066 describes the manufacture of silicon carbide particles by heating silica particles in an atmosphere of hydrocarbon gas and hydrogen gas in a one-step process.

Japanese Patent Application No. 61-6109 describes a process for forming silicon carbide by reducing silica by means of a hydrocarbon at 1300° –1500° C. The silica must be heated to this temperature range before the non-heated hydrocarbon gas is introduced. The hydrocarbon gas cannot be pre-heated or else it is said to decompose before reacting with the silica.

Japanese Patent Application No. 61-6113 describes a process for manufacturing metallic silicon. Silica powder is reacted with a hydrocarbon at a temperature of at least 1300° C. such that part of the silica powder is reduced and converted into silicon carbide. Then silica powder and silicon carbide are charged into a furnace at a temperature of at least 1800° C. to produce metallic silicon.

At the temperatures involved in the one-step process of U.S. Pat. No. 4,327,066 and the foregoing Japanese applications, the rate of pyrolysis of the hydrocarbon is so fast that the carbon will not coat the silica but will form its own distinct particles. This results in distinct silica and carbon particles (similar to the conventional Acheson process). If the carbon does not coat the silica particles, the silica will vaporize as silicon monoxide at the high temperature involved in the process described in the aforementioned U.S. patent and Japanese applications. As a result, there are low product yields.

U.S. Pat. No. 4,869,886 describes a process for producing high density silicon carbide sinters. Particulate silicon is produced by introducing a silicon compound to a first reaction zone at a temperature higher than the melting point of silicon to form fused spherical silicon particles. These particles are then reacted with a carbon compound at a lower temperature to produce silicon carbide.

U.S. Pat. No. 4,900,531 describes a process in which a silicon-containing precursor gas is heated to yield molten silicon which can then react with carbon walls of the reactor to produce silicon carbide. The resulting product is not a powder.

U.S. Pat. No. 5,082,872 describes a process for producing ceramic materials by pyrolysis of preceramic polysilanes by rendering the polysilanes infusible prior to pyrolysis by exposure to UV radiation in the presence of a reactive gas.

U.S. Pat. No.5,093,039 describes a process for producing electrically conductive sintered silicon carbide by mixing two sizes of silicon carbide particles and then heating the mixture. The small silicon carbide particles are produced by reacting a silicon halide and a hydrocarbon.

There has not heretofore been provided a process for producing silicon carbide particles of small particle size in an efficient manner with high yields.

SUMMARY OF THE INVENTION

It is an object of the invention to provide an improved method for producing silicon carbide which is of a very small particle size.

It is another object of the invention to provide a method for producing silicon carbide at relatively low temperatures.

It is yet another object of the invention to provide an improved method for producing silicon carbide using inexpensive starting materials.

It is still another object of this invention to provide an improved method for producing silicon carbide particles of small size without need for crushing the material after production.

It is yet another object of this invention to provide an improved method for producing silicon carbide particles in either a continuous process or a batch process with high yield.

Additional objects, advantages, and novel features of the invention shall be set forth in part in the description that follows and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purpose of the present invention, as embodied and broadly described herein, the improved methods may comprise mixing finely divided silicon source material (e.g., silicon, silicon dioxide, or silicon monoxide particles), with a hydrocarbon in a thermal zone at about 400° to 1000° C. in a manner and for a time sufficient to pyrolyze the hydrocarbon and coat the silicon source material particles with carbon. Then the coated particles are heated to a temperature in the range of about 1100° to 1600° C. to produce silicon carbide particles. The two-step process of the invention is advantageous because the silica particles are first coated with carbon. Then when the particles are heated in a second step to a temperature of at least 1100° C. the carbon and silicon are able to react directly to form silicon carbide very efficiently.

The process of the invention can be carried out in a batch manner or in a continuous manner. The particles of silicon carbide produced in accordance with this invention have small particle size and are therefore very desirable commercially. The particles may range in size from about 0.1 to 5 microns (preferably 0.5 to 5 microns, and more preferably 0.5 to 2 microns). No grinding is required to reduce the particle size.

Other advantages of the present invention will be apparent from the following detailed description.

BRIEF DESCRIPTION OF THE DRAWINGS

The accompanying drawings, which are incorporated in and form a part of the specification, illustrate the preferred embodiments of the present invention and, with the description, explain the principles of the invention.

DETAILED DESCRIPTION OF THE PREFERRED EMBODIMENTS

Figure 1A:
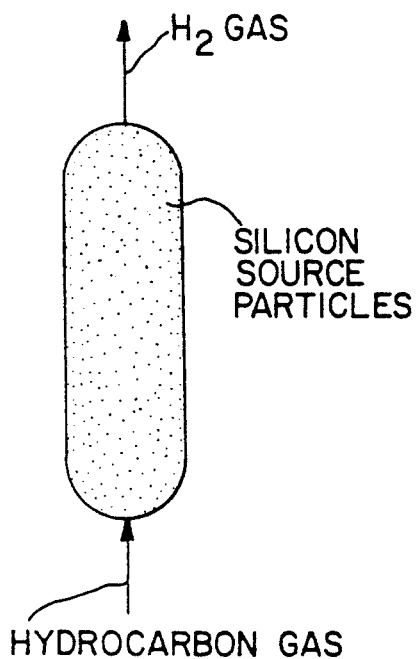
FIGS. 1A and 1B are schematic views illustrating one embodiment of reactor assembly which is useful in this invention for coating particles of silicon source material with carbon and then converting the particles to silicon carbide.
Figure 1B:
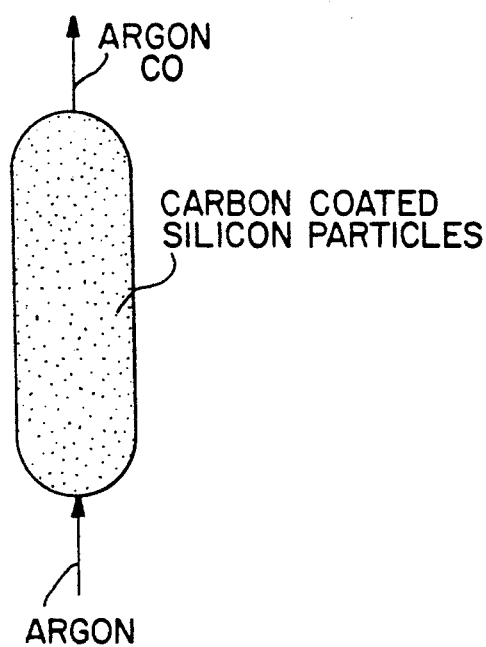

FIGS. 1A and 1B illustrate a reactor assembly which is useful in a batch process for producing silicon carbide particles in accordance with this invention.

The silicon source material is preferably silica (i.e., silicon dioxide) because it is readily available and is inexpensive. Other silicon source materials, such as silicon monoxide or metallic silicon/could also be used, if desired. The particle size of the silicon source material is in the range of about 0.1 to 5 microns and, more preferably, is in the range of 0.5 to 2 microns. Fumed silica generally has a particle size in the range of about 0.001 to 0.5 micron and is very useful herein as a starting material. Silica gel generally has a particle size in the range of about 1 to 2 microns and is also useful herein.

In the process of the present invention the particles of silicon source material (e.g., silica) are coated with a layer of carbon at relatively low temperature prior to being subjected to high temperature where the silicon and carbon can react with each other. Because the silica particles are coated with carbon, higher yields of silicon carbide particles are produced. This makes the process of this invention more efficient than prior processes where some of the silica is lost (as silicon monoxide gas which vaporizes from the silica particles as they are heated at high temperature). In the present invention, on the other hand, the carbon coating on the silica particles minimizes the loss of silica as silicon monoxide.

When the process of the invention is operated as a batch process, the silicon source material particles are contained in a reactor, as shown in FIG. 1A. Preferably the reactor is heated so that the particles are at a temperature in the range of about 400° to 1000° C. A preferred temperature is about 600° C. Then a hydrocarbon gas such as butadiene is introduced into the reactor.

Hydrocarbons having from one to about ten carbon atoms are useful for this purpose. Preferably the hydrocarbon is also heated to about 400° C. or more prior to being introduced into the reactor.

The hydrocarbon pyrolyzes in the reactor and coats the silica particles with a layer of carbon. Oxygen is excluded from the reactor so that the carbon is not oxidized. Generally the carbon coats the surface of the silica particles very quickly (e.g., within a few minutes).

After the silica particles have been coated with carbon at relatively low temperature as described, the particles are next subjected to high temperature (i.e., at least 1100° C.) such that the carbon and the silica react to form silicon carbide particles having a particle size of about 0.5 to 2 microns, preferably. Generally, the coated silica particles are heated to a temperature in the range of about 1100° to 1600° C to produce the silicon carbide particle A preferred temperature is about 1350° to 1450° C. An inert gas such as argon is preferably present.

The silicon carbide particles produced in the method of this invention have very small particle size. Preferably they have a size less than about 5 microns. Even more preferably they have a size less than about 2 microns. No grinding is required.

When the silicon source material comprises silica, the minimum carbon to silicon mole ratio is 3:1. When the silicon source material comprises silicon monoxide, the minimum carbon to silicon mole ratio is 2:1. When the silicon source material comprises silicon metal, the minimum carbon to silicon mole ratio is 1:1.

The reaction between silicon and carbon in the process of the present invention occurs at lower temperatures than previously used because each particle contains both reactants required for the reaction to occur to produce silicon carbide. Particle growth does not occur at the temperatures used in this invention. Consequently, a sinterable sub-micron powder can be made directly without grinding. The overall reaction when using silica and butadiene is:

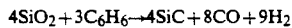
$$4SiO_2 + 3C_6H_6 \rightarrow 4SiC + 8CO + 9H_2$$

When silicon monoxide is used as the silicon source material the reaction is:

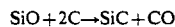
$$SiO + 2C \rightarrow SiC + CO$$

When silicon is used as the source material the reaction is:

$$Si + C \rightarrow SiC$$

The carbon coating step in this invention can be performed using a batch reactor (as shown in FIG. 1A) in which the particles are stationary. The particles are heated to the desired temperature and then the hydrocarbon gas is introduced. Gas flow through the reactor may be continuous or may be cycled with time.

Figure 2A:
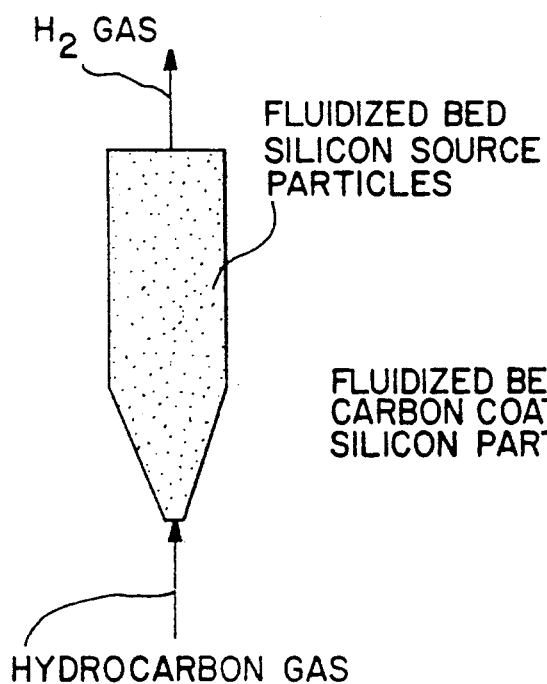
FIGS. 2A and 2B are schematic views illustrating use of a fluidized bed in the process of this invention.
Figure 2B:
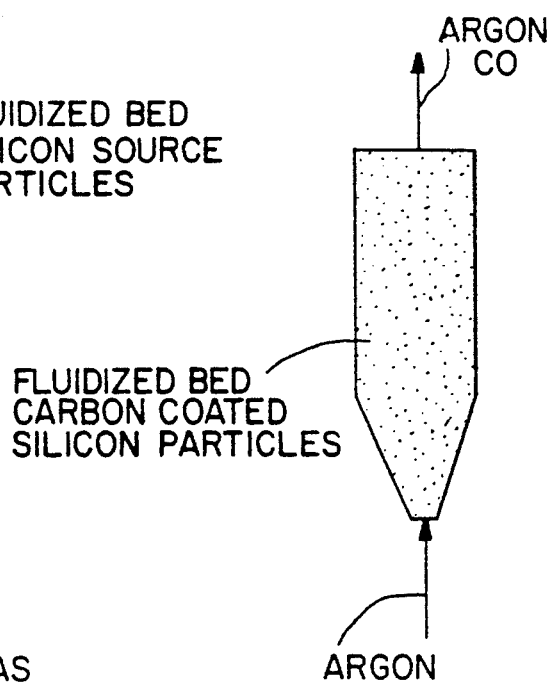

As another embodiment, the particles of silicon source material can be heated in a fluidized bed where good mixing occurs. The hydrocarbon gas is flowed through the bed allowing the gas to pyrolyze and coat the particles with carbon. This is illustrated in FIG. 2A. Then the particles are heated in a second step to a temperature of 1100° to 1600° C. to cause a reaction between the carbon and the silica to produce silicon carbide. This is illustrated in FIG. 2B.

Figure 3:
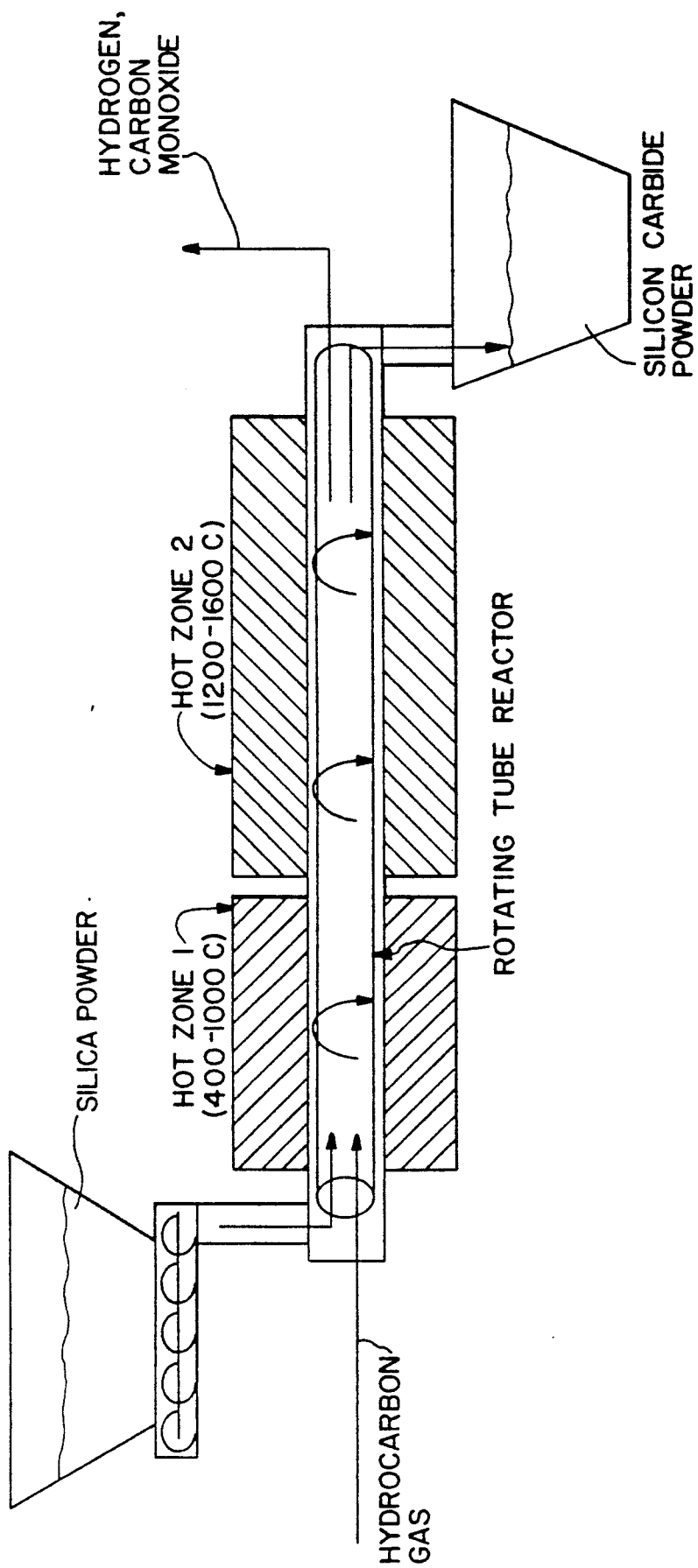
FIG. 3 is a schematic diagram of a rotating tube reactor assembly useful in a continuous process in accordance with this invention.

As another alternative, a rotating tube reactor may be used, as illustrated in FIG. 3. The reactor is preferably sloped slightly downwardly from left to right. Silica powder is fed to the reactor entrance on the left at a controlled rate. Hydrocarbon gas is also fed at this point. As the reactor rotates, the powder is mixed and moves down the axis of the reactor from left to right. The rate at which the powder travels down the axis is determined by the reactor rotation rate and slope angle. As the powder moves through the reactor, it passes through two temperature zones corresponding to the two reaction steps. In the first zone, the silica is coated with carbon. In the second zone, the composite particles of silica and carbon react to form silicon carbide Hydrogen carbon monoxide gases, along with the silicon carbide product, exit the right end of the reactor.

The two-step process of this invention results in very high yields of silicon carbide as compared to the yields obtained using a one-step process of the prior art. Also, the process of this invention can produce silicon carbide at lower temperatures than are conventionally used.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to falling within the scope of the invention as defined by the claims which follow.

The embodiments of the invention in which an exclusive property or privilege is claimed are defined as follows:

1. A method for producing silicon carbide particles comprising the steps of:
    (a) exposing finely-divided particles of a silicon source material to a gaseous hydrocarbon;
    (b) heating said source material and said hydrocarbon to a temperature in the range of about 400° to 1000° C. to pyrolyze said hydrocarbon and coat said particles with carbon; and
    (c) heating said particles in an inert atmosphere to a temperature in the range of about 1100° to 1600° C. for a time sufficient to produce silicon carbide particles.

2. A method in accordance with claim 1, wherein said silicon source material and said hydrocarbon are heated to a temperature of about 600° C.

3. A method in accordance with claim 1, wherein said silicon source material comprises silica.

4. A method in accordance with claim 3, wherein said silica has a particle size less than about 5 microns.

5. A method in accordance with claim 3, wherein said hydrocarbon is present in an amount such that the mole ratio of carbon to silicon is at least 3:1.

6. A method in accordance with claim 1, wherein said silicon source material has a particle size of about 0.5 to 2 microns, and wherein said hydrocarbon comprises butadiene.

7. A method in accordance with claim 1, wherein said silicon source material and said hydrocarbon are each heated to at least 400° C. before they are brought into contact with each other.

8. A method in accordance with claim 1, wherein said silicon source material is contained in a fluidized bed.

9. A method for producing silicon carbide particles comprising the steps of:
    (a) providing finely divided particles of silicon source material;

(b) providing a hydrocarbon source;
(c) heating said particles of silicon source material and said hydrocarbon to a temperature in the range of about 400° C. to 1000° C.
(d) contacting said silicon source material particles with said hydrocarbon for a time sufficient to coat said particles with carbon; and
(e) heating said particles in an inert atmosphere to a temperature in the range of about 1100° to 1600° C. for a time sufficient to cause said silicon source material and carbon to react to form silicon carbide.

10. A method in accordance with claim 9, wherein said silicon source material and said hydrocarbon are heated to a temperature of about 600° C.

11. A method in accordance with claim 9, wherein said silicon source material has a particle size less than about 5 microns.

12. A method in accordance with claim 11, wherein said silicon source material has a particle size of about 0.5 to 2 microns, and wherein said hydrocarbon comprises butadiene.

13. A method in accordance with claim 9, wherein said silicon source material is selected from the group consisting of silicon dioxide, silicon monoxide, and silicon.

14. A method in accordance with claim 9, wherein said silicon source material comprises silica, and wherein said hydrocarbon is present in an amount such that the mole ratio of carbon to silicon is at least 3:1.

15. A method in accordance with claim 9, wherein said silicon source material is contained in a fluidized bed.

16. A method in accordance with claim 9, wherein said silicon source material is introduced into a rotating tube reactor having a first zone heated to a temperature in the range of about 400° to 1000° C. and a second zone heated to a temperature in the range of about 1200° C. to 1600° C.; and wherein said hydrocarbon source is introduced into said first zone.

* * * * *

UNITED STATES PATENT AND TRADEMARK OFFICE
CERTIFICATE OF CORRECTION

PATENT NO. : 5,324,494

DATED : June 28, 1994

INVENTOR(S) : Gregory C. Glatzmaier et al.

It is certified that error appears in the above-identified patent and that said Letters Patent is hereby corrected as shown below:

On the title page, item [75] Inventor:

In the list of inventor, "Rasit Koc" should be added as a co-inventor.

Signed and Sealed this

Thirtieth Day of August, 1994

Attest:

BRUCE LEHMAN

Attesting Officer

Commissioner of Patents and Trademarks